(12) United States Patent
Singaraju

(10) Patent No.: US 11,643,302 B2
(45) Date of Patent: May 9, 2023

(54) SENSING AND NOTIFYING DEVICE FOR ELEVATOR EMERGENCIES

(71) Applicant: OTIS ELEVATOR COMPANY, Farmington, CT (US)

(72) Inventor: Ravikiran Singaraju, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1145 days.

(21) Appl. No.: 16/195,303

(22) Filed: Nov. 19, 2018

(65) Prior Publication Data

US 2019/0152747 A1 May 23, 2019

(30) Foreign Application Priority Data

Nov. 22, 2017 (IN) .............................. 201711041896

(51) Int. Cl.
| | | |
|---|---|---|
| *B66B 5/02* | (2006.01) | |
| *G08B 21/02* | (2006.01) | |
| *H04M 11/04* | (2006.01) | |
| *B66B 1/28* | (2006.01) | |
| *H04R 1/40* | (2006.01) | |
| *B66B 3/00* | (2006.01) | |
| *G10L 25/51* | (2013.01) | |
| *B66B 5/00* | (2006.01) | |

(52) U.S. Cl.
CPC ................ *B66B 5/025* (2013.01); *B66B 1/28* (2013.01); *B66B 3/002* (2013.01); *B66B 5/0012* (2013.01); *G08B 21/02* (2013.01); *G10L 25/51* (2013.01); *H04M 11/04* (2013.01); *H04R 1/406* (2013.01)

(58) Field of Classification Search
CPC ............... H04M 11/04; H04M 11/045; H04M 2242/04; H04R 29/00; H04R 3/005
USPC .................. 381/56; 379/39, 50, 51; 187/247
See application file for complete search history.

(56) References Cited

U.S. PATENT DOCUMENTS

| | | |
|---|---|---|
| 4,482,032 A | 11/1984 | Enriquez et al. |
| 4,649,751 A * | 3/1987 | Onoda ............... G08B 21/0297 376/217 |
| 5,345,046 A | 9/1994 | Rynaski et al. |
| 9,114,953 B2 | 8/2015 | Mason |

(Continued)

FOREIGN PATENT DOCUMENTS

| | | |
|---|---|---|
| CN | 102070050 A | 5/2011 |
| CN | 202670951 U | 1/2013 |

(Continued)

OTHER PUBLICATIONS

Chinese Office Action for Application No. 201811396207.X; dated Nov. 2, 2021; 11 Pages.

(Continued)

*Primary Examiner* — Alexander Krzystan
(74) *Attorney, Agent, or Firm* — Cantor Colburn LLP

(57) ABSTRACT

A detection system is provided. The detection system includes a sensing device and a controller. The sensing device is within an elevator and in communication with the controller. The sensing device continuously monitors sound waves within the elevator and communicates the sound waves as electrical signals to the controller. The controller operates the elevator and analyses the sound waves received as the electrical signals from the sensing device to detect an emergency condition within the elevator.

18 Claims, 4 Drawing Sheets

(56) References Cited

U.S. PATENT DOCUMENTS

| | | | | |
|---|---|---|---|---|
| 2004/0163325 A1* | 8/2004 | Parrini | ............... | B66B 5/025 |
| | | | | 52/741.1 |
| 2008/0078627 A1* | 4/2008 | Wang | ............... | B66B 5/027 |
| | | | | 187/314 |
| 2008/0196980 A1* | 8/2008 | Yamada | ............... | B66B 5/0012 |
| | | | | 187/391 |
| 2011/0303495 A1* | 12/2011 | Kodera | ............... | B66B 5/022 |
| | | | | 187/384 |
| 2013/0168191 A1 | 7/2013 | Mason | | |
| 2015/0114763 A1* | 4/2015 | Kim | ............... | B66B 5/0012 |
| | | | | 187/392 |
| 2017/0018163 A1 | 1/2017 | Pu | | |
| 2018/0251337 A1* | 9/2018 | Matsueda | ............... | B66B 1/3453 |
| 2020/0175843 A1* | 6/2020 | Aslam | ............... | G08B 27/001 |

FOREIGN PATENT DOCUMENTS

| | | |
|---|---|---|
| CN | 102659005 B | 10/2014 |
| CN | 204661058 U | 9/2015 |
| CN | 204778115 U | 11/2015 |
| CN | 205772594 U | 12/2016 |
| CN | 105347165 B | 8/2017 |
| CN | 206384696 U | 8/2017 |
| JP | 2016088699 A | 5/2016 |
| JP | 2017105609 A | 6/2017 |
| KR | 20160150323 A | 12/2016 |
| KR | 20170060756 A | 6/2017 |
| WO | 2017009679 A1 | 1/2017 |
| WO | 2017013460 A1 | 1/2017 |

OTHER PUBLICATIONS

European Search Report for application 18207899.8, dated Apr. 16, 2019, 20 pages.

Anonymous, "Voice Recognition Technology", online Retrieved Nov. 19, 2018, URL:<http://www.cw-iot.com/Scream_Recognition_Device.html>, 3 pages.

Anonymous, "Future Tech: Mitsubishi's voice recognition lift for the disabled and visually-impaired", Online retrieved Nov. 19, 2018, URL:<https://www.joe.ie/tech/future-tech-mitsubishis-voice-recognition-lift-for-the-disabled-and-visually-impaired-15490>, 5 pages.

Anonymous, "Voice operated intelligent Lift/Elevator", Onlinve Retrieved Nov. 19, 2018, URL:<http://www.sooxma.com/docs/Abstracts/SET-05%20Voice%20operated%20intelligent%20Lift%20or%20Elevator.pdf>, 3 pages.

\* cited by examiner

SENSING AND NOTIFYING DEVICE FOR ELEVATOR EMERGENCIES

CROSS-REFERENCE TO RELATED APPLICATIONS

This application claims the benefit of Indian Patent Application No. 201711041896 filed Nov. 22, 2017, which is incorporated herein by reference in its entirety.

BACKGROUND

When an elevator passenger experiences an emergency, the elevator passenger may press an existing alarm or phone button on a control panel of an elevator. However, in cases where the elevator passenger is not in a position to press the existing alarm or phone button, then the existing alarm or phone button is not helpful. For example, these cases include when the elevator passenger not able to press the alarm or phone button because the elevator passenger is alone and has collapsed in elevator, the elevator passenger is subject to an attack inside the elevator, and when the elevator passenger has a physical disability that prevents reaching for the alarm or phone button.

BRIEF DESCRIPTION

In accordance with one or more embodiments, a detection system is provided. The detection system comprises at least one sensing device configured within an elevator and in communication with the controller, the at least one sensing device continuously monitoring sound waves within the elevator and communicating the sound waves as electrical signals to the controller; and the controller operating the elevator and analyzing the sound waves received as the electrical signals from the at least one sensing device to detect an emergency condition within the elevator.

In accordance with one or more embodiments or the detection system embodiment above, the controller analyzes the sound waves to detect any instance of the sound waves over a threshold to determine if the emergency condition exists.

In accordance with one or more embodiments or any of the detection system embodiments above, the threshold can be 60 dB.

In accordance with one or more embodiments or any of the detection system embodiments above, the controller can analyze the sound waves to detect any instance of the sound waves on a range to determine if the emergency condition exists.

In accordance with one or more embodiments or any of the detection system embodiments above, the range can be 85 dB to 90 dB.

In accordance with one or more embodiments or any of the detection system embodiments above, the controller an cause the elevator to stop at an immediate next floor or proceed to an emergency floor and keep the door open when the emergency condition exists.

In accordance with one or more embodiments or any of the detection system embodiments above, the controller can communicate to an external system after determining that the emergency condition exists.

In accordance with one or more embodiments or any of the detection system embodiments above, the communicating to the external system can comprise sending an alarm, notifying building personal, or calling a help line.

In accordance with one or more embodiments or any of the detection system embodiments above, the at least one detecting device is installed inside or around a car of the elevator.

In accordance with one or more embodiments or any of the detection system embodiments above, the detection system can operate under a listening mode that is enabled or disabled at the controller during maintenance, security, or out of use conditions.

In accordance with one or more embodiments or any of the detection system embodiments above, the at least one detecting device can comprise four devices, each of which further comprises a microphone coupled to a transceiver, the microphone converts the sound waves into the electrical signals and the transceiver communicates the electrical signal to the controller.

In accordance with one or more embodiments, a method executed by a controller operating an elevator and at least one sensing device is provided. The method comprising continuously monitoring, by the at least one sensing device, sound waves within an elevator; communicating, by the at least one sensing device, the sound waves as electrical signals to the controller; and analyzing, by the controller, the sound waves received as the electrical signals from the at least one sensing device to detect an emergency condition within the elevator.

In accordance with one or more embodiments or the method embodiment above, the controller analyzes the sound waves to detect any instance of the sound waves over a threshold to determine if the emergency condition exists.

In accordance with one or more embodiments or any of the method embodiments above, the threshold can be 60 dB.

In accordance with one or more embodiments or any of the method embodiments above, the controller can analyze the sound waves to detect any instance of the sound waves on a range to determine if the emergency condition exists.

In accordance with one or more embodiments or any of the method embodiments above, the range can be 85 dB to 90 dB.

In accordance with one or more embodiments or any of the method embodiments above, the controller can cause the elevator to stop at an immediate next floor or proceed to an emergency floor and keep the door open when the emergency condition exists.

In accordance with one or more embodiments or any of the method embodiments above, the controller can communicate to an external system after determining that the emergency condition exists.

In accordance with one or more embodiments or any of the method embodiments above, the communicating to the external system can comprise sending an alarm, notifying building personal, or calling a help line.

In accordance with one or more embodiments or any of the method embodiments above, the at least one detecting device is installed inside or around a car of the elevator.

In accordance with one or more embodiments or any of the method embodiments above, the detection system can operate under a listening mode that is enabled or disabled at the controller during maintenance, security, or out of use conditions.

In accordance with one or more embodiments or any of the method embodiments above, the at least one detecting device can comprise four devices, each of which further comprises a microphone coupled to a transceiver, the microphone converts the sound waves into the electrical signals and the transceiver communicates the electrical signal to the controller.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In accordance with one or more embodiments, a system comprises one or more sensing devices continuously sensing decibel levels of people. For instance, when the people are speaking under normal circumstances, the decibel levels of the people are generally 50 to 60 decibels. However, when a person speaks under agitated circumstances, the decibel levels of that person are greater than 60. The system can be implemented as a method, computer program product, and/or a device, and is further described herein with respect to, but not limited thereto, an elevator example. The system will now be described with respect to FIGS. 1-2.

Figure 1:
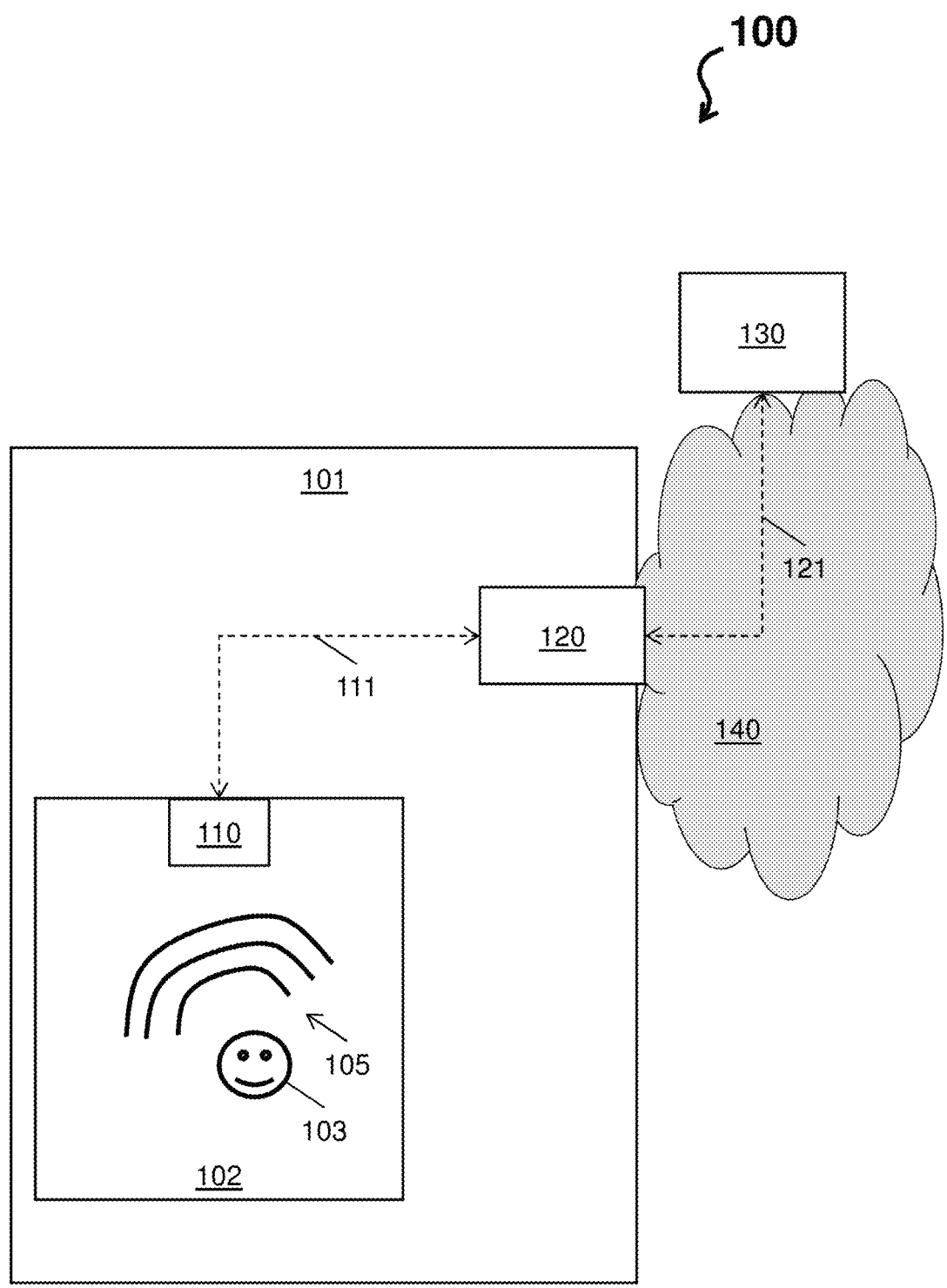
FIG. 1 depicts a detection system according to one or more embodiments.

FIG. 1 depicts a detection system 100 according to one or more embodiments. The detection system 100 can be integrated across a facility 101 housing an elevator 102 for transporting at least one person 103, who provides sound waves 105. The detection system 100 comprises at least one sensing device 110 in communication 111 with a controller 120. The controller 120 is also in communication 121 with an external system 130 across a network 140.

In general, the detection system 100 operates to detect emergencies within the elevator. The detection system 100 is an example and is not intended to suggest any limitation as to the scope of use or operability of embodiments described herein (indeed additional or alternative components and/or implementations may be used). Further, while single items are illustrated for items of the detection system 100, these representations are not intended to be limiting and thus, any item may represent a plurality of items.

The facility 101 is representative of buildings with multiple floors, high-rise buildings, sky scrapers, boats, cruise ships, parking garages, etc. The elevator 102 can be a movable container or car within the faculty 101 that controlled and operated by the controller 120 for the transportation of objects and the at least one person 103. The at least one person 103 is a human of any age that can produce sound waves 105 detectable by the at least one sensing device 110. The sound waves 105 are a vibration that propagate as an audible wave of pressure, through a transmission medium such as air within the elevator. The sound waves 105 can be quantified in decibels (dB), which is a logarithmic unit used to express a ratio of values. As indicated herein, the at least one person 103 while is speaking generally creates the sound waves 105 on a range of 50 dB to 60 dB. Further, when the at least one person 103 is under agitated circumstances, the at least one person 103 can create the sound waves 105 on at a level greater than 60 dB.

The at least one sensing device 110 can be an electro-mechanical component that detects events in an environment and generates an electrical signal as a function of the events (an audio decibel sensing device). The at least one sensor 103 can utilize software and/or firmware to carry out operations particular thereto. The software and/or firmware utilized by the at least one sensor 103 can be provided with respect to continuously sensing decibel levels of the at least one person 103. An example of at least one sensing device 110 is a microphone (e.g., transducer that converts the sound waves 105 into an electrical signal) coupled to a transceiver (e.g., communications and/or interface adapter) that communicates 111 the decibel levels as the electrical signal to the controller 120. In accordance with one or more embodiments, the at least one sensing device 110 can be installed inside or around the elevator 102 (e.g., inside a car, inside a hoistway for the car, outside the car, etc.) within the faculty 101 to detect the decibel levels of the at least one person 103. Note that the communications 111 can be supported by a controller area network (CAN bus) designed to allow the controller 120 to communicate with the at least one sensing device 102 without a host computer.

The controller 120 can include any processing hardware, software, or combination of hardware and software utilized by the detection system 100 to carry out computer readable program instructions by performing arithmetical, logical, and/or input/output operations. The controller 120 operates to control positions, speeds, destinations, door operations, etc. of the elevator 102, along with transmit communication to and from the at least one sensing device 110 and the external system 130. The controller 120 also analyzes the sound waves 105 to detect emergency conditions.

The external system 130 can be a computer, data server, and/or distributed computing system (e.g., a cloud based backend system) that stores software/firmware, along with provides remote services for the detection system 120. In this regard, the backend sub-system 106 can provide remote service functionality with respect to calling emergency services (e.g., fire, police, ambulance, etc.), contacting personnel of the facility 101, and the like.

The network 140 can be a computer and/or data system that allows and support communications with nodes thereon to share resources (e.g., the controller and the external system 130). The network 140 can include. An example of the second network 107 can include a wide area network designed to allow the gateway 105 to communicate with the backend sub-system 106. Note that the communications 111 and 131 (and the network 140 itself) can include any wired or wireless communication architecture, such as Bluetooth, Wi-Fi, ZigBee, etc.

Figure 2:
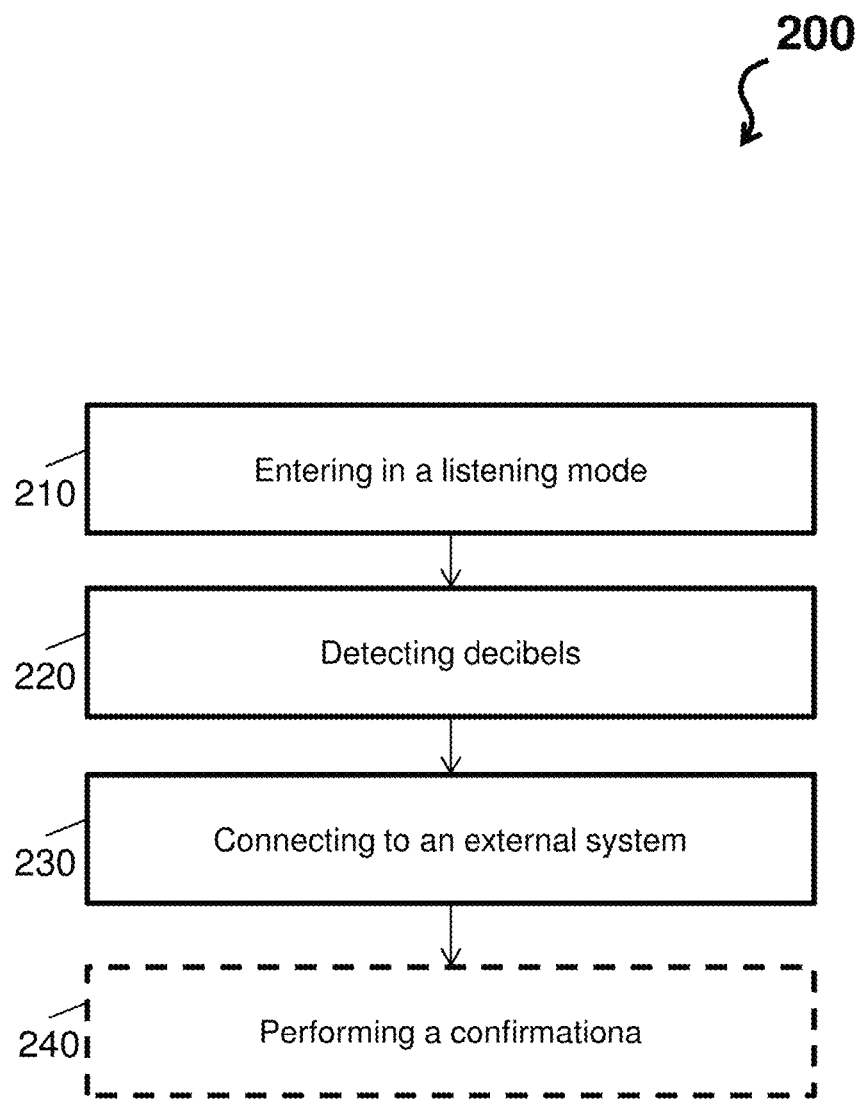
FIG. 2 depicts a process flow of a detection system according to one or more embodiments.

FIG. 2 depicts a process flow 200 of the detection system 100 according to one or more embodiments. The process flow begins at block 210, where the detection system 100 enters into a listening mode. The listening mode is an operational state of the detection system 100 where the at least one sensing device 110 monitor the sound waves 105 within the elevator 102. The listening mode can be enabled continuously. The listening mode can further be turned off during maintenance, security, and out of use conditions. The listening mode can be enabled or disabled at the controller 120 through direct manual input or through automatic scheduling.

At block 220, the detection system 100 detects decibels. That is, the at least one sensing device 110 continuously monitors the sound waves 105 to detect any instance of those sound waves 105 and communicates those instance to the controller 120. In this regard, the controller 120 analyzes the sound waves 105 communicated 111 from the at least one sensing device 110 to determine if an emergency condition exists. Optionally, when the detection system 100 detects decibels, the controller 120 can cause the elevator 102 to stop at an immediate next floor or proceed to an emergency floor (e.g., a floor designated to handle emergencies, like a ground floor with a front desk) and keep the door open.

In accordance with one or more embodiments, the at least one sensing device 110 continuously monitors and provides the sound waves 105 to the controller 120, which detects any instance of those sound waves 105 over a threshold (to determine if an emergency condition exists). In accordance with one or more embodiments, the threshold is 60 dB. Note that detecting decibel levels provides the technical effect and benefit for the detection system of being language neutral, in that while different countries and regions would have different words, normal discussions are still less than 60 dB.

In accordance with one or more embodiments, the at least one sensing device 110 continuously monitors and provides the sound waves 105 to the controller 120, which detects any instance of those sound waves 105 on a range, e.g., of 85 dB to 95 dB (to determine if an emergency condition exists).

At block 230, the detection system 100 connects to the external system 130. For instance, the controller 120 after determining that the emergency condition exists can communicate 121 to the external system 130 to send an alarm, notify building personal, call a help line, etc.

At dashed block 240, the detection system 100 performs a confirmation. The confirmation can be optional (as indicated by the dashed block). In accordance with one or more embodiments, before emergency services are called, the help line that was connected to can be used to solicit direct feedback from the at least one person 103 as to whether an emergency exists. In accordance with one or more embodiments, before emergency services are called, the at least one sensing device 110 continuously monitors the sound waves 105 to detect any subsequent instances of those sound waves 105, the at least one sensing device 110 communicates those subsequent instances to the controller 120, and the controller 120 analyzes the sound waves 105 communicated 111 from the at least one sensing device 110 to confirm if the emergency condition exists.

In view of the above process flow 200, the technical effects and benefits of the detection system 100 of FIG. 1 include providing a mechanism for detecting emergencies in an elevator 105 that otherwise may be missed by existing system (e.g., when passengers are not in a position to press existing phone or alarm buttons), which results in improved passenger safety.

Figure 3:
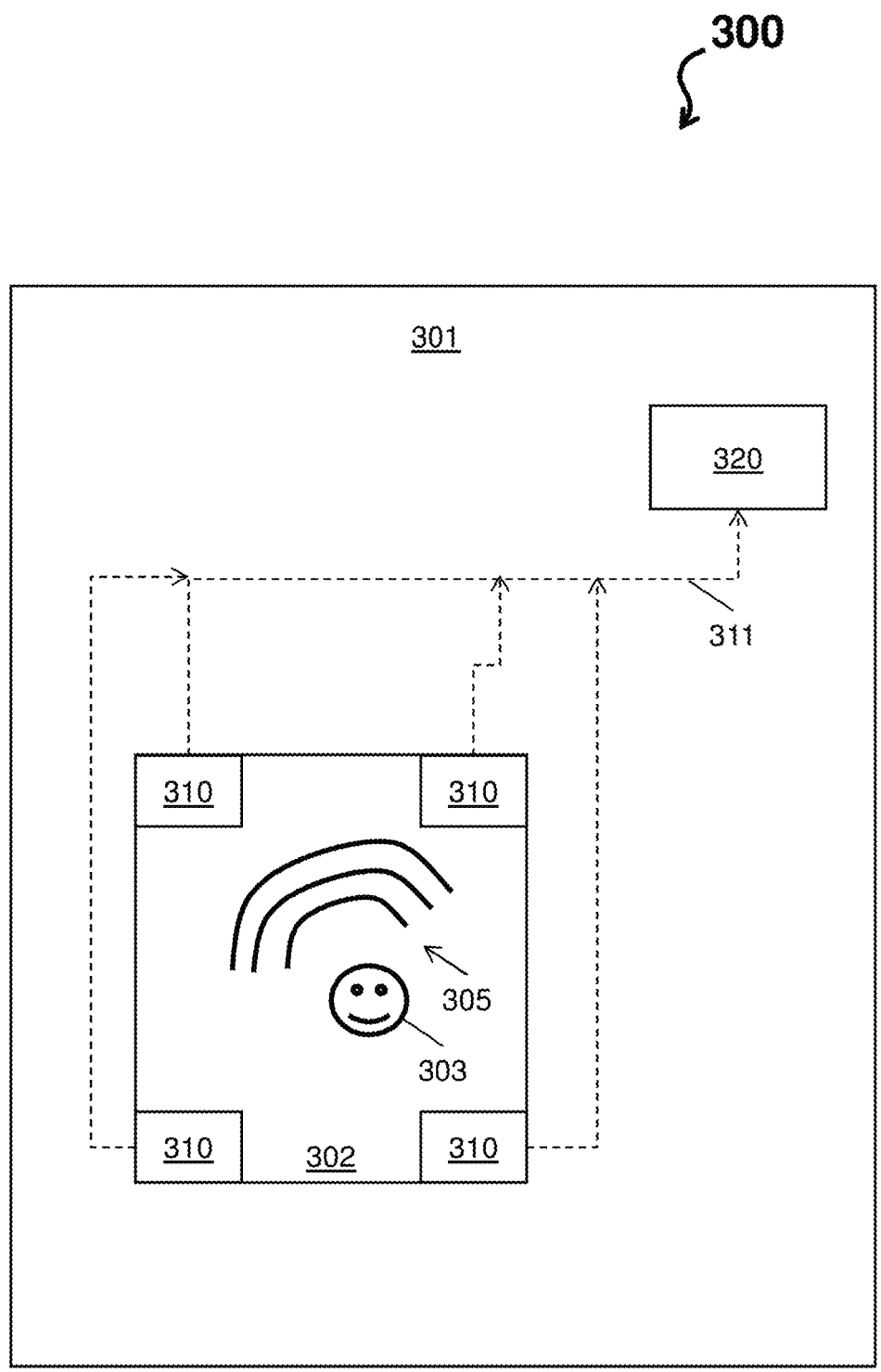
FIG. 3 depicts a detection system according to one or more embodiments.
Figure 4:
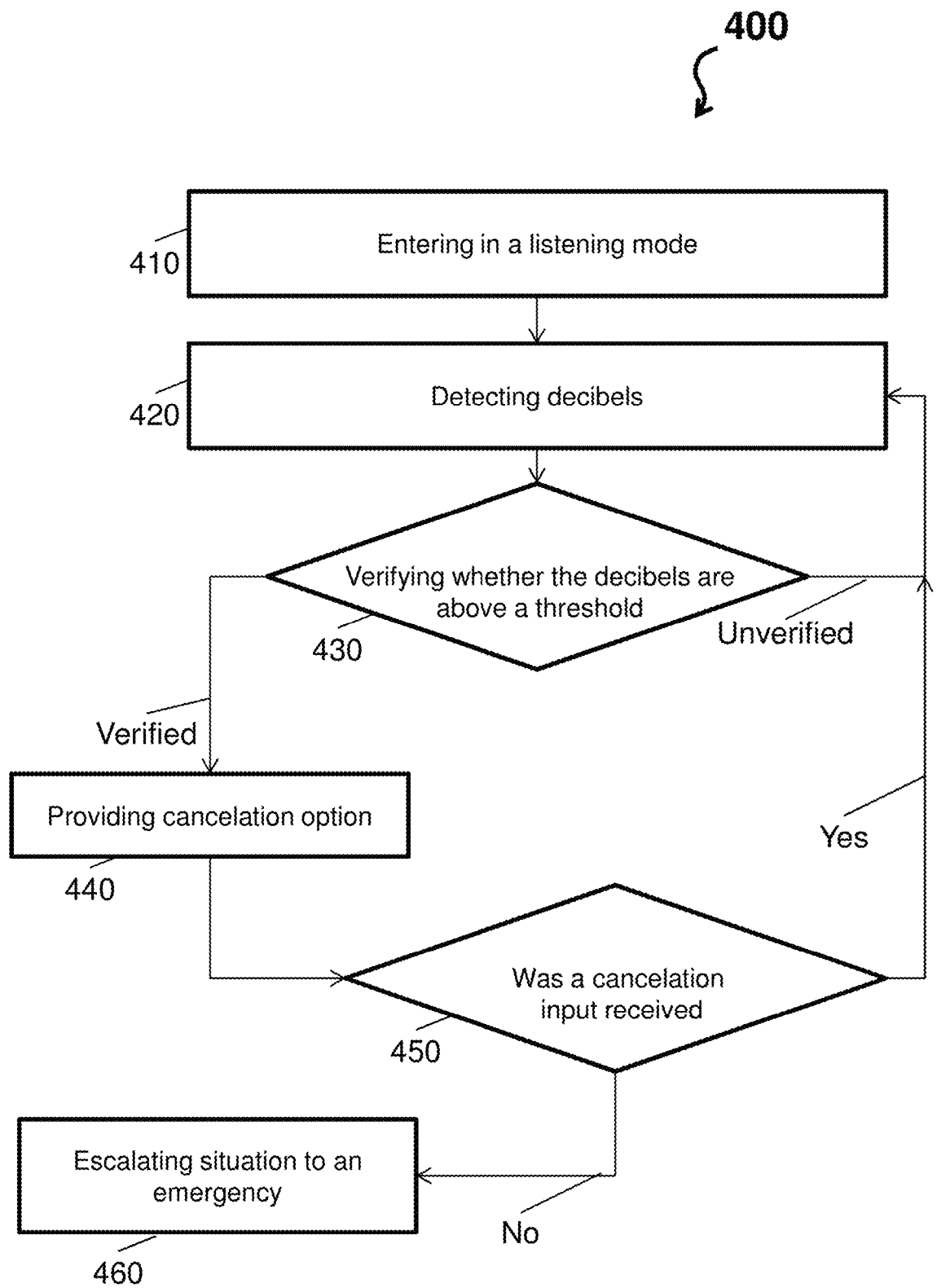
FIG. 4 depicts a process flow of a detection system according to one or more embodiments.

Turning now to FIG. 3-4, commissioning an updating operations of the detection system are herein described. FIG. 3 depicts a detection system 300 according to one or more embodiments. The detection system 300 can be integrated across a facility 301 housing an elevator 302 for transporting at least one person 303, who provides sound waves 305. The detection system 300 comprises a plurality of sensing devices 310 in communication 311 with a controller 320.

In general, the detection system 300 operates to detect emergencies within the elevator. As shown in the detection system 300 of FIG. 3, the elevator 302 is provisioned with four audio decibel sensing devices (e.g., the plurality of sensing devices 310) installed in the four corners (e.g., inside a car of the elevator 302) within the faculty 101 to detect the decibel levels of the at least one person 103, which would continuously sense for the audio/sound levels inside the elevator 103. During any problem for the passengers (e.g. the at least one person 303) who are not in a position to press existing alarm or phone buttons can make loud sounds (shout) for assistance. When the passengers shout for help (e.g., provide that the sound waves 350 on a decibel range between 85 dB and 95 dB) then the detection system 300 immediately alerts a building control room or help line.

The detection system 300 is an example and is not intended to suggest any limitation as to the scope of use or operability of embodiments described herein (indeed additional or alternative components and/or implementations may be used). Further, while single items are illustrated for items of the detection system 100, these representations are not intended to be limiting and thus, any item may represent a plurality of items. Further, items of the detection system 300 that are similar to the detection system 100 of FIG. 1 are not reintroduced for ease of explanation.

FIG. 4 depicts a process flow 400 of the detection system 300 according to one or more embodiments. At block 410, the detection system 300 enters into a listening mode. The listening mode is an operational state of the detection system 300 where the plurality of sensing devices 310 collectively monitor the sound waves 305 within the elevator 302.

At block 420, the detection system 300 detects decibels. That is, the plurality of sensing devices 310 collectively and continuously monitor the sound waves 305 to detect any instance of those sound waves 305 and communicates those instance to the controller 320.

At decision block 430, the detection system 300 verifies whether the decibels are above a threshold. In this regard, the controller 320 analyzes the sound waves 305 communicated 311 to determine if an emergency condition exists. If the decibels are not above the threshold, then the process flow 400 returns to block 420 (as indicated by the 'Unverified' arrow). If the decibels are above the threshold, then the process flow 400 proceeds to block 440 (as indicated by the 'Verified' arrow).

At block 440, the detection system 300 provides a cancelation option. In accordance with one or more embodiments, the cancelation option can include a delay where passengers are provided an opportunity to prevent the implementation of the emergency condition. In this regard, the passengers can hit a cancelation button or speak at a normal tone to provide cancelation input. At decision block 450, if the cancelation option is provided to the detection system 310, the process flow 400 returns to block 420 (as indicated by the 'Yes' arrow) and the emergency condition is canceled. If the cancelation option is not provided to the detection system 310, the process flow 400 proceeds to block 470 (as indicated by the 'No' arrow).

At block 470, the detection system 300 escalates the situation to an emergency. Optionally, when the detection system 300 detects decibels, the controller 320 can cause the elevator 302 to stop at an immediate next floor or proceed to an emergency floor and keep the door open.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A detection system comprising:
   a controller operable to receive sound waves from at least one sensing device configured within an elevator, the at least one sensing device operable to continuously monitor sound waves within the elevator and communicate the sound waves as electrical signals to the controller; and
   the controller operating the elevator and analyzing the sound waves received as the electrical signals from the at least one sensing device to detect an emergency condition within the elevator;
   wherein the emergency condition comprises a person speaking under agitated circumstances; and
   the controller operable to perform a confirmation analysis of the emergency condition, wherein the confirmation analysis comprises cancelling the emergency condition if, subsequent to the detection of the emergency condition, analyzing the sound waves results in a determination that the person is no longer speaking under agitated circumstances.

2. The detection system of claim 1, wherein the controller analyzes the sound waves to detect any instance of the sound waves over a threshold to determine if the emergency condition exists.

3. The detection system of claim 2, wherein the threshold is 60 dB.

4. The detection system of claim 1, wherein the controller analyzes the sound waves to detect any instance of the sound waves on a range to determine if the emergency condition exists.

5. The detection system of claim 1, wherein the controller causes the elevator to stop at an immediate next floor or proceed to an emergency floor and keep the door open when the emergency condition exists.

6. The detection system of claim 1, wherein the controller communicates to an external system after determining that the emergency condition exists,
   wherein the communicating to the external system comprises sending an alarm, notifying building personal, or calling a help line.

7. The detection system of claim 1, wherein the at least one detecting device is installed inside or around a car of the elevator.

8. The detection system of claim 1, wherein the detection system operates under a listening mode that is enabled or disabled at the controller during maintenance, security, or out of use conditions.

9. The detection system of claim 1, wherein the at least one detecting device comprises four devices, each of which further comprises a microphone coupled to a transceiver,
   wherein the microphone converts the sound waves into the electrical signals and the transceiver communicates the electrical signal to the controller.

10. A method executed by a controller, the method comprising:
    receiving sounds waves from at least one sensing device within an elevator;
    wherein the sound waves comprise electrical signals;
    analyzing, by the controller, the sound waves received as the electrical signals from the at least one sensing device to detect an emergency condition within the elevator;
    wherein the emergency condition comprises a person speaking under agitated circumstances; and
    performing a confirmation analysis of the emergency condition, wherein the confirmation analysis comprises cancelling the emergency condition if, subsequent to the detection of the emergency condition, analyzing the sound waves results in a determination that the person is no longer speaking under agitated circumstances.

11. The method of claim 10, wherein the controller analyzes the sound waves to detect any instance of the sound waves over a threshold to determine if the emergency condition exists.

12. The method of claim 11, wherein the threshold is 60 dB.

13. The method of claim 10, wherein the controller analyzes the sound waves to detect any instance of the sound waves on a range to determine if the emergency condition exists.

14. The method of claim 10, wherein the controller causes the elevator to stop at an immediate next floor or proceed to an emergency floor and keep the door open when the emergency condition exists.

15. The method of claim 10, wherein the controller communicates to an external system after determining that the emergency condition exists,
    wherein the communicating to the external system comprises sending an alarm, notifying building personal, or calling a help line.

16. The method of claim 10, wherein the at least one detecting device is installed inside or around a car of the elevator.

17. The method of claim 10, wherein the detection system operates under a listening mode that is enabled or disabled at the controller during maintenance, security, or out of use conditions.

18. The method of claim 10, wherein the at least one detecting device comprises four devices, each of which further comprises a microphone coupled to a transceiver,
    wherein the microphone converts the sound waves into the electrical signals and the transceiver communicates the electrical signal to the controller.

* * * * *